Dec. 25, 1934.   J. H. KJELLSTROM   1,985,505
KNOCKED DOWN SPOOL
Filed July 16, 1931
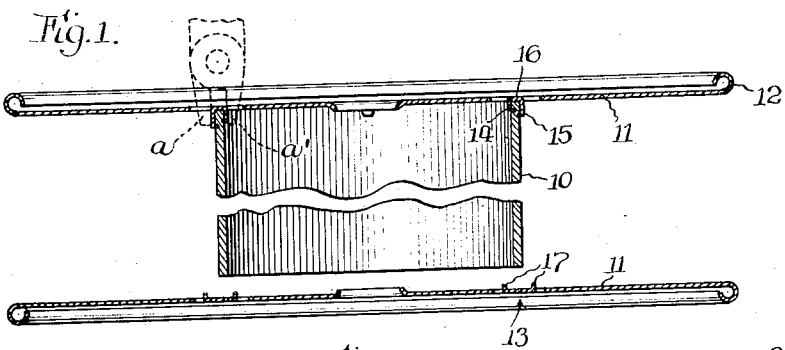
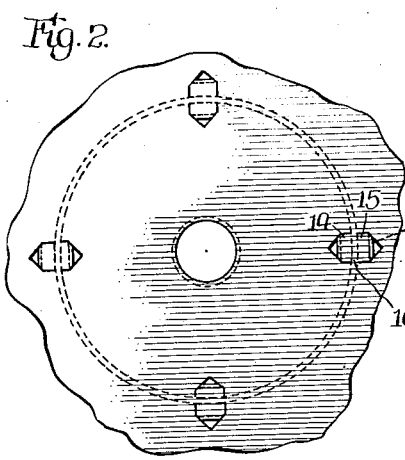
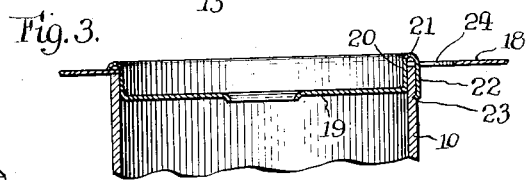
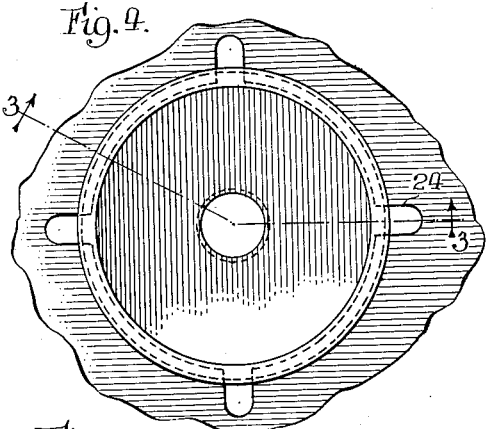
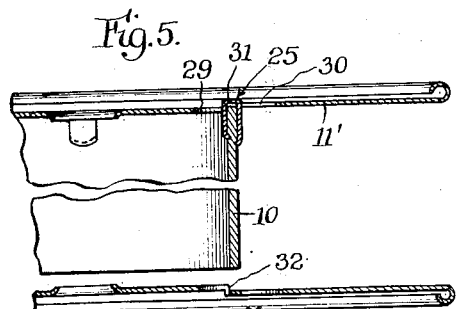
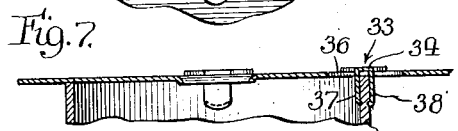
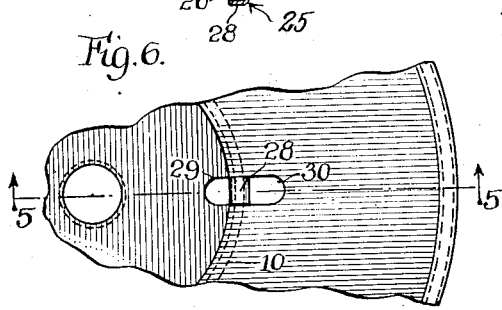
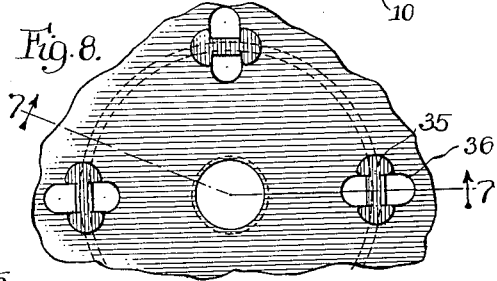
Inventor:
John H. Kjellstrom, Patented Dec. 25, 1934

1,985,505

UNITED STATES PATENT OFFICE 1,985,505

KNOCKED-DOWN SPOOL

John H. Kjellstrom, Rockford, Ill., assignor to J. L. Clark Manufacturing Co., Rockford, Ill., a corporation of Illinois Application July 16, 1931, Serial No. 551,134

20 Claims. (Cl. 242—123)

The invention relates to spools or reels of the type which is adapted for shipment in knocked-down form and the object of the invention is to provide a spool having an improved mode of fastening the heads thereof onto the ends of a tubular body or core, by means of simple construction capable of being produced at a low cost and adapted for easy and convenient application without the aid of expensive tools or equipment.

A further object is to provide head fastening means of the character above set forth, in the form of a plurality of devices formed of sheet metal and adapted to be secured to the core by means of a tool entered through apertures in the head.

The objects of the invention thus set forth together with other and ancillary advantages are obtained by the construction and arrangement shown in the accompanying drawing forming a part hereof, in which:

Figure 1 is a longitudinal sectional view through the parts of a spool, one head being attached and the other shown in position ready for attachment.

Fig. 2 is a fragmentary plan view of one of the heads before attachment to the core.

Fig. 3 is a fragmentary central longitudinal sectional view showing a modified form of fastening means, and taken approximately in the plane of line 3—3 of Fig. 4.

Fig. 4 is a fragmentary end elevational view of the form shown in Fig. 3.

Fig. 5 is a fragmentary longitudinal sectional view similar to Fig. 1 but showing still another modification, the view being taken approximately in the plane of line 5—5 of Fig. 6.

Fig. 6 is a fragmentary end view showing the head attached.

Fig. 7 is a fragmentary longitudinal sectional view taken approximately in the plane of line 7—7 of Fig. 8 and showing still another modification.

Fig. 8 is a fragmentary end view further illustrating the construction shown in Fig. 7.

Referring first to Figs. 1 and 2 of the drawing, the spool comprises a tubular core 10 preferably formed of pasteboard or other fibrous material, and heads 11 in the form of flat circular plates or disks preferably of metal and having peripheral strengthening curls 12. The disks are provided with the usual central apertures for mounting purposes.

The heads 11 are adapted to be supplied by the manufacturer in the form shown in the case of the lower head in Fig. 1, in which form they are adapted for subsequent attachment by the user to the ends of tubular cores. As shown, the heads 11 are constructed to provide fastening devices in the form of clips 13 on the head, which clips in this instance are in holding relation to the head by being formed integral therewith. In forming such clips, tongues 14 and 15 are cut out of the metal of the head on opposite sides of a central web 16, the metal of the head being suitably slit to form each of the tongues. Each of the tongues, moreover, is bent at its free end into a plane substantially perpendicular to the disk to form prongs 17.

It will be observed from the form of the clips shown in the case of the lower head in Fig. 1, that as an incident to the formation of the prongs 17 the clips are made of channel shape, and are so positioned as to be adapted to straddle the end of the core to which the head is to be applied, with such end of the core bearing against the inner side of the web 16. The clips thus serve to facilitate the proper positioning of the head onto the end of the core.

The operation of securing the heads in position on the ends of the core is illustrated in Fig. 1 wherein I have shown a suitable tool in dotted outline. This tool is in the form of ordinary pincers having jaws $a$ and $a'$, the ends of which are adapted to engage the tongues 14 and 15 simultaneously and to bend the same toward each other when an endwise force is exerted on the tool. Finally the tool is operated to force the jaws $a$ and $a'$ together, and in this operation the prongs 17 on each of the tongues are forced into the material of the core at opposite sides thereof. It will be observed that one of the tongues, herein the tongue 14, is made somewhat shorter than the other one so that the opposite prongs 17 of each clip will occupy an offset relation to each other as shown clearly in Fig. 1.

Referring now to the construction shown in Figs. 3 and 4, the head in this instance comprises two plates, one in the form of a disk 18 having a central aperture of a diameter corresponding to the internal diameter of the core 10; and the other in the form of a central plug 19 having an upstanding peripheral flange 20 curled outwardly at its upper edge to form an annular bead 21 adapted to overlie the inner peripheral edge of the disk 18. On the head, formed integral with the flange 20 are a plurality of tongues 22, the free ends of which are provided with prongs 23. Opposite these tongues 22 are slots 24 cut in the disk 18 and extending radially outwardly from the outer peripheral edge of the core 10.

It will be seen that by the use of a suitable tool such as that shown in Fig. 1, each tongue 22 may be forced easily through its slot 24 and bent into engagement with the outer periphery of the core, finally embedding the anchoring prong 23 in the material of the core; and it is to be observed that each of said tongues 22 coacts with the opposite flange 20 and with the outwardly turned bead 21 to form in effect a U-shaped fastening clip on and in holding relation to the head, which clip, when secured to the core as above described, serves to hold the head against axial or lateral movement.

In the form shown in Fig. 5, the fastening means is generally similar to that shown in Figs. 1 and 2 except that in this instance U-shaped clips 25 are formed separately from the head. Thus they have tongues 26 and 27 connected by a yoke portion 28; and the head is formed with slots 29 and 30 through which the tongues 26 and 27 may be inserted. These slots are separated by a central web 31 adapted to engage with the end edge of the core. The yoke portion 28 of the clip rests on or engages with the web and is thus in holding relation to or anchored on the head. In this instance, the disk 11' forming the head has a central depression forming an annular shoulder 32 for the purpose of centering the head upon the core preliminary to the operation of securing the head in place.

In the embodiment illustrated in Figs. 7 and 8, clips generally designated 33 are similar to those illustrated in connection with Figs. 5 and 6 except that the yoke portion 34 has a pair of oppositely extending wings 35 formed integral therewith and arranged to project beyond the opposite side edges of a slot 36 formed in the head and extending on opposite sides of the end of the core 10 in holding relation to the head. The clip is adapted to be inserted through the slot 36 with its tongues 37 and 38 straddling the end of the core and its wings 35 overlying the face of the disk at opposite sides of the slot 36. Thus it will be observed that when the tongues and their anchoring portions are forced into engagement with the core by a tool inserted through the opposite ends of the slot 36, the head will be secured firmly to the end of the core.

I claim as my invention:—

1. A spool having a tubular core, a head plate adapted to overlie one end edge of the core and having a plurality of slots adjacent the core, and a plurality of fastening clips formed integral with said plate and having radially spaced portions inserted through said slots and embedded in the material of the core with said portions disposed parallel to the axis of the core.

2. A spool having a tubular core, a head plate adapted to overlie one end edge of the core, and a plurality of U-shaped fastening clips having yoke portions integral with said plate and legs having prongs engaging in the material of the core at opposite sides thereof.

3. A spool having a tubular core, a head bearing on one end edge of the core, and a plurality of fastening devices each in the form of a substantially U-shaped clip anchored to the head and straddling the end of the core, the legs of each clip being of different lengths and each having an anchoring prong embedded in the material of the core.

4. A spool having a tubular core, a head bearing on one end edge of the core, and a plurality of fastening devices each in the form of a substantially U-shaped clip anchored to the head and straddling the end of the core, the legs of each clip being of different lengths and having anchoring prongs embedded in the material of the core and disposed in offset relation with respect to each other.

5. A spool having a tubular core, a head in the form of a plate overlying one end edge of the core, and means for securing the head onto the core including a U-shaped fastening clip formed integral with the plate and having portions straddling the end of the core and secured thereto, said plate being slotted to permit of access to said legs by means of a tool for forcing said legs into holding engagement with the core.

6. A spool having a tubular core, a head in the form of a plate overlying one end edge of the core, and means for securing the head onto the core including a separately formed fastened clip having a portion overlying the head and a part secured to the wall of the core, said plate being slotted on one side of the wall of the core to permit of access to said part by means of a tool.

7. A spool having a tubular core, a head bearing on one end edge of the core, and means for fastening the head onto the core comprising a plurality of U-shaped clips formed separately from the head and secured to the material of the core, said clips being adapted to straddle the end of the core, and said head having slots extending transversely from opposite sides of the core wall through which the jaws of a tool of the pincer type may be inserted in securing said legs to the core.

8. A spool having a tubular core, a head bearing on one end edge of the core, and means for fastening the head onto the core comprising a plurality of U-shaped clips formed separately from the head and secured to the material of the core, said clips being adapted to straddle the end of the core and said head having slots extending transversely from opposite sides of the core through which the jaws of a tool of the pincer type may be inserted in securing said legs to the core wall, and said head having a web portion intermediate each pair of slots and bearing against the end edge of the core with the yoke portion of each clip engaging with said web portion.

9. A spool having a tubular core, a head in the form of a disk bearing upon one end edge of the core, and means for fastening the head onto the core comprising a substantially U-shaped clip and having legs engaging opposite sides of the core, said disk being slotted radially in opposite directions from the wall of the core to receive said legs, and said clip having a yoke portion in holding relation to the head.

10. A spool having a tubular core, a head comprising a plate centrally apertured with its inner peripheral edge portion overlying the end of the core, said head further comprising a plate having a peripheral flange inserted through the aperture in the first mentioned plate and fitting snugly in the end of the core, and a plurality of fastening clips formed integral with said flange and bent into opposed relation thereto into engaging relation with the outer side of the core, the first mentioned plate having slots therein through which the clips may pass.

11. A spool having a tubular core, a head comprising two plates, one extending radially outwardly from the core and the other being disposed within the core, one of said plates having formed integral therewith a plurality of fastening devices engaging with said core, the other one of said plates having slots for receiving said fastening devices.

12. In the manufacture of spools of the knocked-down type having a tubular core and a head to be secured on the end thereof, the method of fastening the head onto the core which consists in forming slots in the head so disposed that when the head is placed on the core the slots extend radially from the ends thereof, and then inserting a tool of the pincer type through each slot to force a fastening device on the head through the slot and into holding relation to the core.

13. In the manufacture of spools having a tubular core and a head to be secured on one end thereof, the method of fastening the head which consists in slotting the head to form openings on opposite sides of the core wall when the head is placed thereon, and then inserting a pincer-like tool through said slots to force radially spaced anchoring elements on the head into holding engagement with the material of the core.

14. In the manufacture of spools of the character set forth having a tubular core and a head in the form of a disk adapted to bear against the end of the core, the method of fastening the disk onto the core which consists in cutting out from the material of the head portions disposed on opposite sides of the wall of the core, and inserting a tool of the pincer type through the slots while forcing the cut-out portions into holding engagement with the end of the core.

15. In the manufacture of spools of the character set forth having a tubular core and a head in the form of a disk adapted to bear against the end of the core, the method of fastening the disk onto the core which consists in cutting out from the material of the head portions disposed adjacent the end of the core, and inserting a tool of the pincer type through each slot to force the cut-out portion into holding engagement with the core.

16. A spool having a tubular core, a head bearing on one extreme end edge of the core, and means for securing the head in position on the core including a plurality of fastening devices each comprising a pair of radially spaced fastening elements directly engaging the inner and outer sides of the core inwardly of said head and in straddling relation to the end of the core, said head having radial slots adjacent the outer fastening elements.

17. A spool having a tubular core, a head bearing on one extreme end edge of the core, and means for securing the head in position on the core including a plurality of fastening devices each comprising a pair of radially spaced fastening elements directly engaging the inner and outer sides of the core inwardly of said head and in straddling relation to the end of the core, said head having slots adjacent the fastening elements and extending both inwardly and outwardly radially of the core.

18. A spool having a tubular core, a head bearing on one extreme edge of the core, and means for securing the head in position on the core including radially spaced fastening elements straddling the core wall and respectively engaging with the inner and outer sides of the core wall inwardly of said head.

19. A spool having a tubular core, a head bearing on one edge of the core, and means for securing the head in position on the core including radially spaced fastening elements straddling the core wall and extending inwardly from said head varying distances in a direction perpendicular thereto and respectively engaging with the inner and outer sides of the core wall at one end thereof, said elements having anchoring prongs at their inner ends.

20. A spool having a tubular core, a head including a plate having an inner surface with which the extreme end edge of the core is adapted to abut, and means for securing the head to the core at a plurality of points circumferentially of the core and including radially spaced members straddling the core wall and respectively engaging the inner and outer sides of said wall, certain of said members being in the form of fastening elements adapted to be bent laterally into engagement with the outer side of the core at circumferentially spaced points, and said plate having slots therein extending radially from the core adjacent said fastening elements to permit of access to the latter from the outer side of the plate.

JOHN H. KJELLSTROM.